April 25, 1961 E. AZARI 2,981,411

CARD PROCESSING APPARATUS

Filed April 28, 1958 5 Sheets-Sheet 1

INVENTOR:
Eric Azari
By Smyth & Roston
Attorneys

April 25, 1961 E. AZARI 2,981,411

CARD PROCESSING APPARATUS

Filed April 28, 1958 5 Sheets-Sheet 2

INVENTOR:
Eric Azari
By Smyth & Roston
Attorneys

INVENTOR:
Eric Azari
By Smyth & Roston
Attorneys

April 25, 1961 E. AZARI 2,981,411

CARD PROCESSING APPARATUS

Filed April 28, 1958 5 Sheets-Sheet 4

INVENTOR:
Eric Azari
By Smyth & Roston
Attorneys

April 25, 1961 E. AZARI 2,981,411

CARD PROCESSING APPARATUS

Filed April 28, 1958

5 Sheets-Sheet 5

INVENTOR
Eric Azari

By Smyth & Roston
Attorneys

United States Patent Office 2,981,411

Patented Apr. 25, 1961

2,981,411

CARD PROCESSING APPARATUS

Eric Azari, Pacific Palisades, Calif., assignor to The Magnavox Company, Los Angeles, Calif., a corporation of Delaware Filed Apr. 28, 1958, Ser. No. 731,413

22 Claims. (Cl. 209—72)

The present invention relates generally to apparatus for transporting information storage cards, and the invention is more particularly concerned with pneumatic apparatus for transporting information storage cards from one station to another or for controllably transferring such cards from one transport means to another.

The use of data processing systems and apparatus has become increasingly prevalent in recent years. In one system of this general type, the data is stored on a multiplicity of individual cards. Each card has information recorded on it in the form of a pattern of holes, or by magnetic areas of one polarity or another, or by other appropriate means.

Systems and apparatus using rotatable vacuum pressure transport drums have been proposed for selecting, merging, sorting, collating and for otherwise processing the information storage cards. These systems and apparatus have proven to be most successful in their operation. In apparatus of this general type, the cards are selectively fed to the peripheral edge of a transport drum from a holder station adjacent the drum. The drum is rotatable and a vacuum pressure is provided at its peripheral edge to hold the transported cards securely on that edge. The drum is used, either alone or in conjunction with other similar drums, to carry the cards past a reading or writing station at which they are processed by suitable transducers. This processing, for example, may establish certain sorting controls and the cards may be selectively transferred to other drums under the action of these controls. These other drums may then carry the cards to different holding stations into which the cards are deposited.

The vacuum pressure rotatable transport drums referred to above will be described in greater detail subsequently in the present specification. Each of these drums, as will be described, is equipped with peripheral slots and air is drawn through the hollow interior of the drum and inwardly through the slots to create a vacuum pressure at the peripheral surface of the drum. This vacuum pressure, as noted, enables the cards to be firmly retained on the peripheral surface of each drum for circulation from one card holder station to another.

As noted in the preceding paragraphs, it is often desirable in systems of the type described above to utilize a plurality of transport drums and to transfer the information storage cards controllably and selectively from one drum to another. For example, when it is desired to select a card bearing certain wanted data from a stack of information cards, all the cards may be fed to a first rotatable vacuum pressure transport drum and transported on that drum past one or more transducer heads. These transducer heads read the information on successive cards until the wanted card is reached. After each card, other than the wanted card, is read by the transducer heads, it may be circulated, for example, on the first drum to a card holding station. When the wanted card is read, however, it may be automatically transferred to a second drum for further processing.

Automatically controlled gate mechanisms are known for providing a transfer of selected information storage cards from one transport drum to another for purposes such as the purpose outlined in the preceding paragraph. Copending application 566,404 filed February 20, 1956 in the name of Jerome B. Wiener, for example, describes and claims apparatus in which mechanically pivotable gates are used for obtaining such a transfer.

The gate transfer mechanism described in the copending Wiener application is disposed between two adjacent rotatable vacuum transport drums which are intended to be rotated in opposite directions. For example, one of the drums may be rotated in a clockwise direction and the other drum may be rotated in a counterclockwise direction. The gate transfer mechanism is controllable to be pivoted to three distinct positions. This control may, for example, be effectuated by a pair of opposing electromagnets in conjunction with a pair of opposing coil springs. The coil springs serve to hold the gate in a neutral position between the two drums when neither of the electromagnets is energized. When the gate is in its neutral position it is incapable of producing a transfer of cards from one of the vacuum transport drums to the other. When one of the electromagnets is energized, the gate is pivoted so that it engages the periphery of one of the transport drums to strip cards from that drum to cause the cards so stripped to be transferred to the other drum. In like manner, when the other electromagnet is energized, the reverse action occurs and the gate is pivoted so that it engages the peripheral surface of the other drum to cause cards from the latter transport drum to be transferred to the former.

A similar controllable transfer of the cards from one vacuum transport drum to another in a card processing apparatus may be achieved by controllably directing air jets between the drums, either in a tangential or radial direction. These jets may, for example, be under the control of suitable solenoid valves, and they are directed so that they are capable of lifting selected cards from the peripheral edge of one of the drums to cause such cards to be transferred to the other drum. This type of apparatus is disclosed and claimed, for example, in copending application Serial No. 562,154 which was filed in the name of Stewart L. Peck et al. on January 30, 1956.

Both the mechanical and pneumatic types of gate transfer mechanisms described above have been used successfully. These types of mechanisms, however, require a rotation in mutually opposite directions of the drums between which the transfer is to be made. Moreover, when a card is transferred from one drum to another by the gate transfer mechanisms discussed above, the face of the cards contacting the drum to which the transfer is made is opposite from the face which originally contacted the drum from which the transfer was made.

As fully described in copending application Serial No. 614,686 filed October 8, 1956 in the name of Jerome B. Wiener et al., the rotation of the transport drums in mutually opposite directions may under some circumstances unnecessarily complicate the data processing apparatus. Moreover, it may be sometimes desirable, especially when the information is sorted on the cards in magnetic or photographic form, for one face of the card to be used for recording the data and for the other face to be the one that bears against the surface of the transport medium. This is because excessive wear of the magnetic or photographic material on the face of the card may result when that face contacts the supporting transport medium. It is therefore sometimes desirable to provide a gate transfer mechanism which is capable of transferring cards from one transport medium to another without an attendant reversal of the contacting face of each transferred card.

The copending application Serial No. 614,686 referred to above provides a gate transfer mechanism which is especially suited for use in circumstances under which it is desirable for the transport drums to rotate in one direction only. The gate transfer mechanism is also used when it is desirable for a single face only of each of the information storage cards to contact the surface of the transport drum throughout the entire processing operation.

The co-pending application S.N. 614,686 describes in one embodiment a gate transfer mechanism which uses a pair of spaced parallel guide rails of generally arcuate configuration. These guide rails extend between two transport drums to form a path for the cards from one of the drums to the other. Suitable means are used to direct streams of pressurized fluid, such as air, against the cards on the periphery of one of the drums. These streams overcome the vacuum retaining effect of that drum on the cards and cause such cards to be successfully lifted from the drum and transferred to the path between the guide rails. Subsequent rotation of the drum causes each of the lifted cards to be moved along the path between the guide rails until it comes under the influence of the other drum. The other drum then draws the particular card onto its peripheral surface.

It is clear that the cards transferred by the transfer mechanism of the copending application S.N. 614,686 are not reversed insofar as their drum contacting faces is concerned, and because of this, each card engages the second transport drum on the same surface with which it engaged the first drum. It will also be apparent that both the first and the second drums associated with the transfer mechanism of the copending application can rotate in the same direction. As pointed out in the co-pending application, these features permit a general simplification of the transport and of the data processing apparatus in which the transfer mechanism is used. Also, these features prevent any undue wear of the information recorded on the individual cards.

The transfer mechanism described above performs its intended function with a high degree of reliabilty and satisfaction. However, this mechanism is dependent to some extent upon the length of the transported cards for optimum operational efficiency. This follows, because the length of the guide rails should be less than the length of the cards to enable the first vacuum transport drum to act on a transferred card until the other end of that card comes under the influence of the second transport drum to enable the second drum to pull the card the remaining distance through the guide rails.

Therefore, for a given length for each information card in the transfer mechanism of the copending application 614,686, the diameters of the vacuum pressure transport drums capable of being used can be considered to have a certain maximum permissible dimension. Should the transport drum, for example, have a relatively large diameter, the guide rails may have to be bent into a relatively sharp arc in order to conform with the desired maximum length of less than the length of individual cards. This relatively sharp arcuate configuration of the guide rails has a tendency to harm and damage the cards transferred by the mechanism.

Copending application Serial No. 730,102 filed April 22, 1958 by Eric Azari et al. discloses in one of its embodiments a transfer mechanism which is related in some respects to the type disclosed and claimed in the copending application 614,686 discussed immediately above. However, the structure of the latter transfer mechanism is such that its guide rails need not be shorter than the length of the individual cards used in the processing apparatus with which it is associated. This overcomes any limitations which may be inherent in the structures described in the preceding paragraphs. Since the transfer mechanism of the copending application Ser. No. 730,102 is independent of the length of the cards, it may be used with drums of any desired diameter without any necessity for the guide rails to be formed into an acute arc which would tend to jam and damage the cards.

The gate transfer mechanism of the copending application Serial No. 730,102 provides a pair of stationary guide rails for transporting the information cards. These guide rails are spaced apart in parallel relationship, and a series of pressurized fluid jets are directed at any angle through each of the rails. These jets cooperate such that the pressurized fluid streams emitted by the jets in each rail meet in the center of the guide path formed by the rails. The meeting streams set up a resultant stream along the guide path which serves to move cards rapidly along the guide path.

The present invention provides a transport means for the information storage cards which is similar in some respects to the one disclosed and claimed in the copending application Ser. No. 730,102. However, the transport medium and mechanism of the present invention is predicated on a different operating principle, and this permits certain simplifications in the resulting structure.

The present invention provides a single stationary guide surface for transporting the information cards, and a series of pressurized fluid jets are directed at an angle through this surface at spaced intervals along the surface. The pressurized fluid streams emitted by the jets set up a Bernoulli effect between the cards and the guide surface which carries the cards to be transported rapidly along the surface and in intimate contact with the surface.

Thus, a single supporting surface can, in accordance with the present invention serve as a transport guide surface for the information storage cards.

As indicated above, the structure of the present invention can be used to provide an improved transfer means for the information storage cards from one rotatable vacuum transport drum, or other transport medium, to another. As will be described, the structure of the invention can also take the form of a stationary drum or cylinder with the fluid jets causing the cards to be transported around the peripheral surface of the member. Moreover, and as will also be described, the structure of the invention can be used to transport cards efficiently and rapidly from one card holder station to another for processing, and for performing all the sorting and other operations on the cards of which the rotatable vacuum pressure drums are capable.

Figures 8, 9:
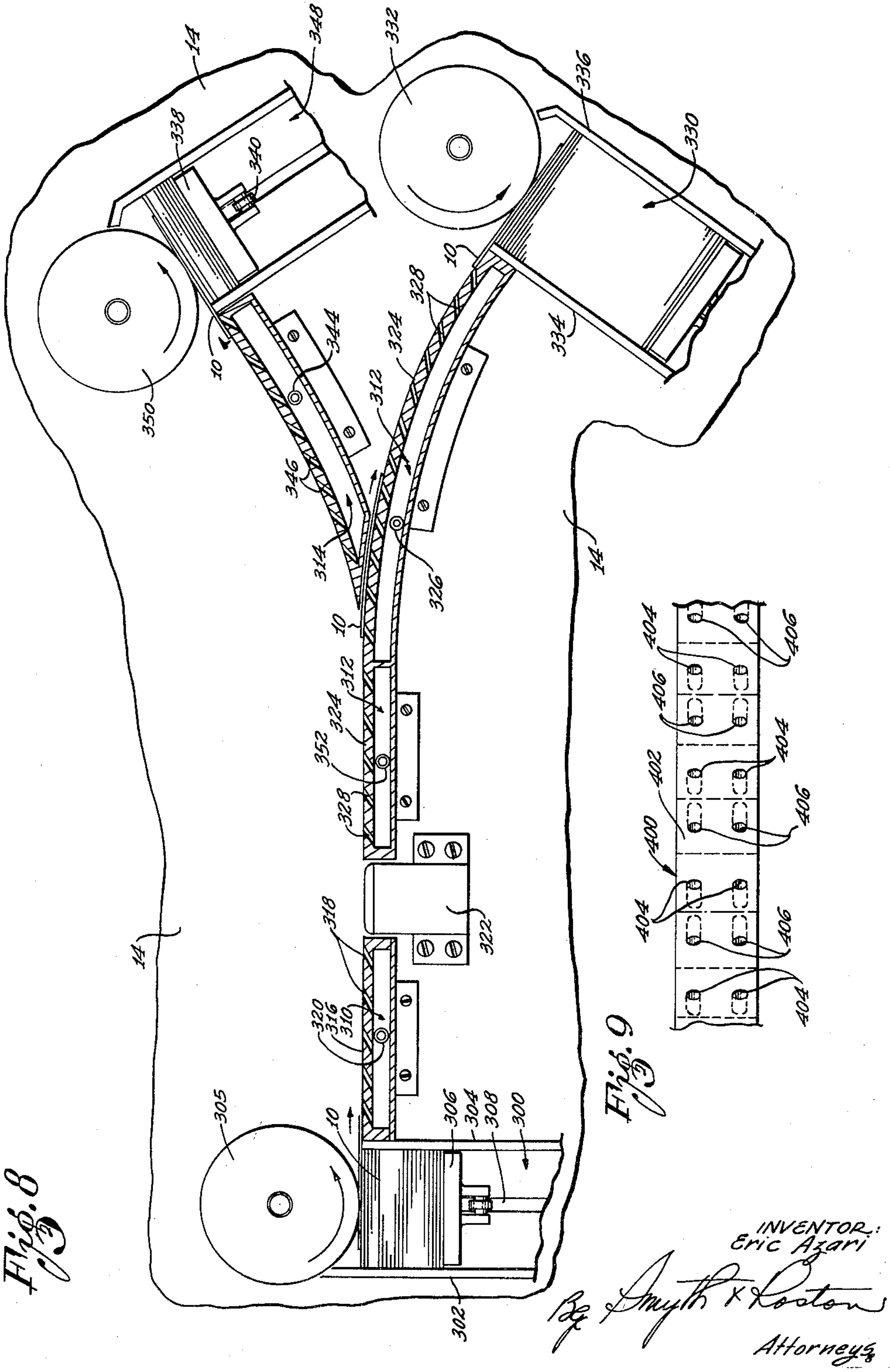
Figure 8 is a top plan view of a typical data processing apparatus in which the concepts of the present invention are applied to provide a transport means for information storage cards between several card holding stations.
Figure 10:
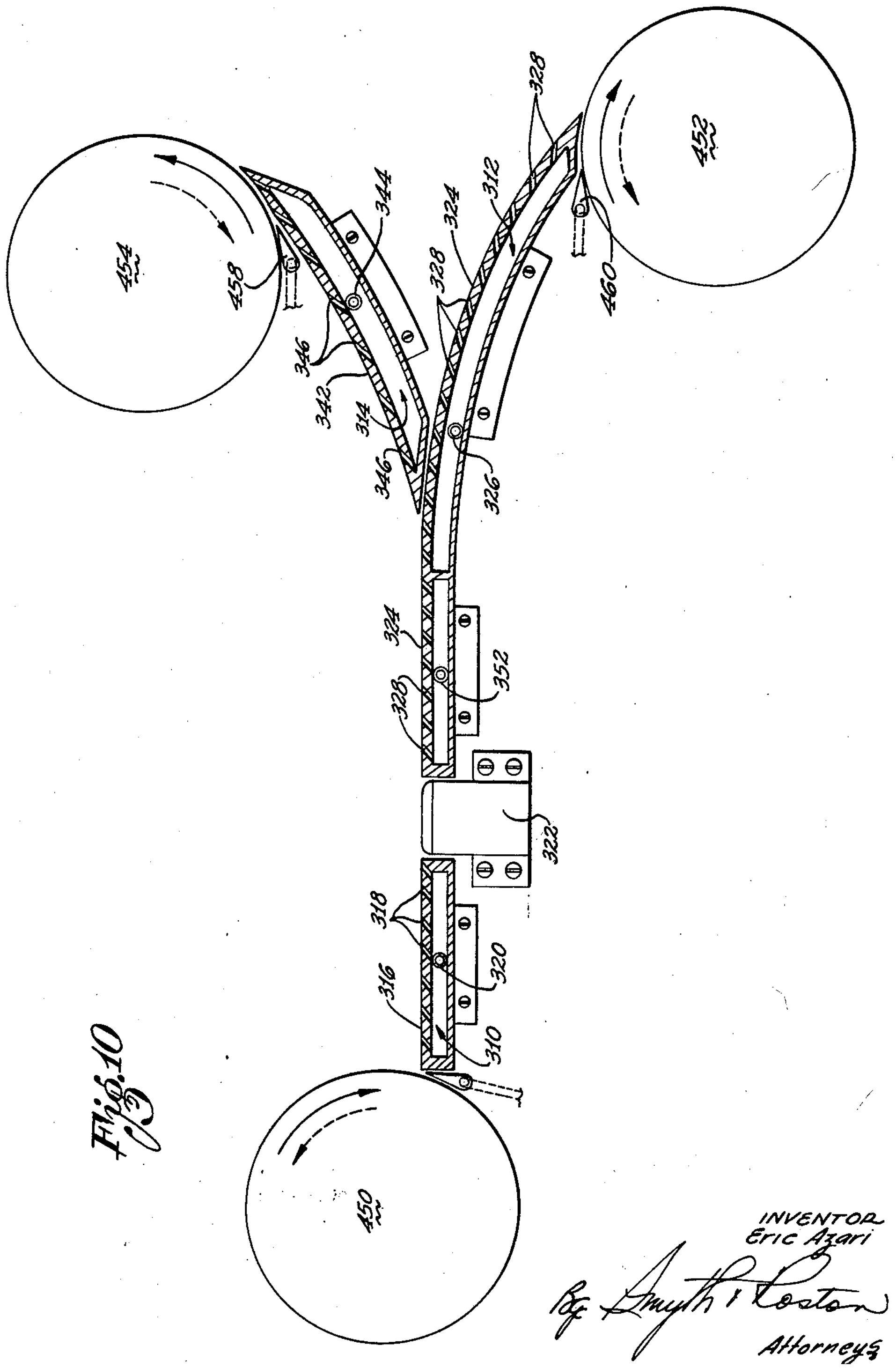

Figure 9 is a fragmentary elevational view of an element constructed in accordance with the invention and having a guide surface which is capable of transporting cards in either one of two opposing directions under the selective control of a first plurality and of a second plurality of jets of pressurized fluid; and Figure 10 is a top plan view of another type of data processing equipment incorporating the concepts of the present invention and providing selective transport for information storage cards between several transport drums of the rotatable or stationary type.

Figure 1:
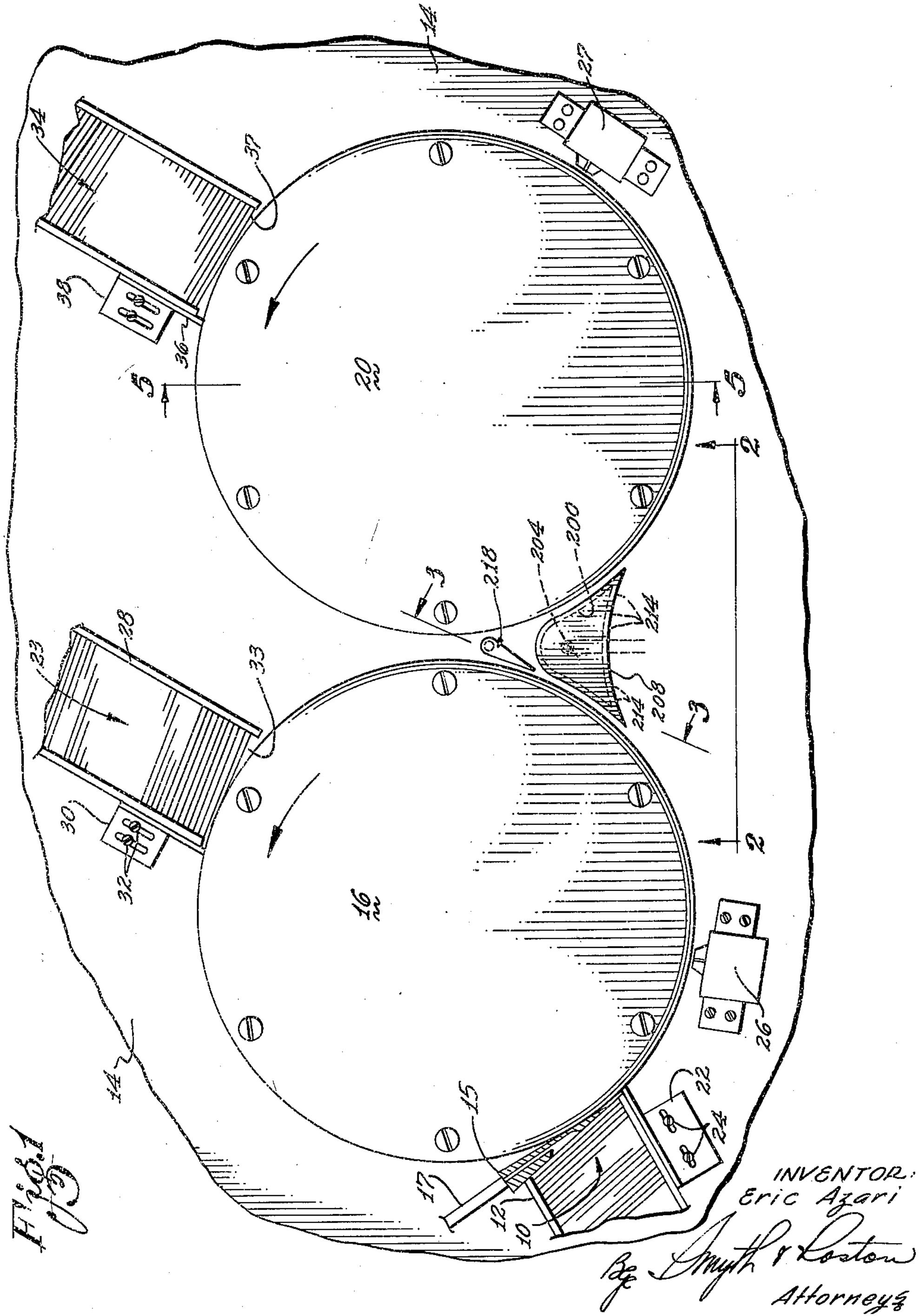
Figure 1 is a top plan view schematically illustrating apparatus for a simple data processing system utilizing a pair of adjacent rotatable vacuum transport drums and incorporating a transfer mechanism constructed in accordance with one embodiment of the invention to provide a controllable transfer of information storage cards from one of the drums to the other.

Referring to the drawings and more particularly to Figures 1 to 4 inclusive, it will be observed that the illustrated data processing apparatus utilizes a plurality of information cards 10 which are disposed in stacked relationship in a card holder station 12 (Figure 1). As used in the specification and in the claims, the term "cards" is intended to cover any type of discrete elements capable of recording and subsequently reading bits of information. The bottom edge of each card in the station rests on a flat surface such as a horizontal table top 14. The cards 10 are the information storage cards referred to earlier in the present specification, and each card is provided with a plurality of bits of information which are recorded on one of its surfaces. These bits of information may, for example, be represented by magnetic areas of one polarity or another. The bits of information may be disposed in a plurality of horizontal rows, and corresponding bits of information in each row may be aligned into vertical columns.

A pair of drums 16 and 20 are mounted for rotation on the horizontal table top 14 about a pair of spaced, parallel vertical axes. These drums are both adapted to be rotated in the same direction such as in a counterclockwise direction as shown in Figure 1. Although rotatable drums are shown in Figure 1, it should be appreciated that any suitable transport means can be moved. The transport means may be movable in different paths than rotary paths and may also be stationary, as will become more apparent from the subsequent discussion.

The card holder station 12 is mounted on the table top 14 with its mouth adjacent the peripheral surface of the drum 16. The relationship is such that the cards may be successively drawn from the mouth of the station by the drum 16 and circulated with the drum in accordance with the movements of the peripheral surface of the drum. A stop member 22 is mounted on the table top 14 adjacent the trailing wall of the station 12. This stop member 22 is mounted on the table top, for example, by means of a pair of screws 24 which extend through slots in the stop member. This mounting arrangement enables the stop member to be adjustably positioned with respect to the peripheral surface of the drum 16. The stop member is adjusted to form a throat with the peripheral surface of the drum which allows only one card at a time to be drawn from the mouth of the station 12 by the drum 16.

A retainer, which is indicated generally at 15, extends partially across the mouth of the card holder station 12 to contact the rear end of the front face of the leading card in the station. The retainer is provided with a card supporting surface which communicates with a conduit 17 extending through the retainer. Air may be withdrawn through the conduit 17 to produce a vacuum force at the card supporting surface, and this vacuum force acts on the leading card in the station 12. The vacuum force is sufficiently strong to retain the leading card in the station 12 despite the vacuum force exerted on the forward end of the front face of that card by the periphery of the drum 16. This latter vacuum force tends to withdraw the leading card from the station.

When the vacuum force at the card supporting surface of the retainer 15 is interrupted, the vacuum force exerted at the peripheral surface of the drum 16 becomes predominant. This causes the leading card in the station 12 to be drawn out of the station by the drum 16 and become transferred to the periphery of the drum. In this manner, by interrupting the vacuum force in the retainer 15 either periodically or at a variable rate, an intermittent feed of cards from the card holder station to the drum may be obtained. The cards can also be transferred to the drum 16 in a continuous and steady stream by completely cutting off the vacuum force at the card supporting surface of the retainer 15. Then the cards are fed in a one-by-one sequence through the throat formed by the stop member 22, as described above.

The construction and operation of the retainer 15 and its associated control members are described in detail in copending application Serial No. 552,506, now U.S. Patent No. 2,927,791, filed December 12, 1955 in the name of Hans Stern.

The station 12 is mounted on the table top 14 with its mouth adjacent the peripheral surface of the vacuum transport drum 16, as noted above. Suitable transducer means are provided for reading the bits of information recorded on each card, or for recording new bits, as the cards are transported by the drum past these transducer means. For purposes of convenience, a single transducer member 26 is illustrated as positioned adjacent the drum 16 in Figure 1. The transducer member 26 may be of the electro-magnetic type, for example, and it serves to read certain identifying information on the cards as they are successively drawn from the mouth of the station 12 by the drum 16 and transported past this transducer member. The transducer member 26 may also be used to write information as the cards move with the drum past that member. The transducer member 26 develops a control signal which actuates a suitable control circuit. In this way, the circuit acts to determine the particular cards which are to be transferred to the vacuum transport drum 20 and those which are to be circulated around the vacuum transport drum 16 so as to become deposited, for example, in an output station 28. A transducer member 27 may be positioned on the table top 14 adjacent the drum 20, and this transducer member may be similar to the transducer member 26. The transducer member 27 serves to process the cards transferred to the drum 20 so that information recorded on such cards may be read, or new information may be written on the transferred cards.

The output station 28 is positioned with its mouth adjacent the periphery of the drum 16, and this station is displaced around the drum from the input card holder station 12 and from the transducer member 26 by a predetermined angular distance in the direction of rotation of the drum. The output station 28 has a stop member 30 mounted adjacent its trailing wall. This stop member is mounted on the table top 14 by means of a pair of set screws 32 extending through slots in the member. The stop member 30 is positioned against the periphery of the drum 16 so that cards cannot pass the mouth of the station 28 but are stripped from the drum and deposited in that station. A pick-off member 33 is disposed in contiguous relationship to the drum 16 between the walls of the station 28 and adjacent the leading wall. This pick-off member assures that the cards will become deposited in the station in the same order as their movement with the drum 16 to the station. This pick-off member may be similar in its construction to the pick-off member described in copending application Serial No. 538,111 filed October 3, 1953 in the name of Robert M. Hayes et al.

The vacuum pressure transport drum 20 may also have an output card holder station 34 positioned adjacent its periphery. The output station 34, like the output station 28, has a stop member 36 mounted adjacent its trailing wall. The stop member 36 is secured to the table top 14 by means of a pair of set screws 38. A pick-off 37, corresponding to the pick-off 33, is disposed in contiguous relationship to the drum 20 adjacent the leading wall of the card holder station 34. The stop member 36 and the pick-off 37 are positioned to strip cards from the periphery of the drum 20 and cause them to be deposited in the station 34 in the same order as the movement of cards with the periphery of the drum 20.

It should be noted that for purposes of simplicity the various stations and transfer arrangements have been described in their simplest form. That is, the input station 12 has been described as sequentially making available the cards in the station to the drum 16, which cards are deposited in the output station 28 or in the output station 34 by means of the fixed stop members 30 and 36 and their associated pick-offs 33 and 37. These latter stop members are positioned so that a card cannot pass between them and the periphery of their associated drums and so that all cards transported to the output stations are deposited in them. Of course, other controllable transfer mechanisms are known for feeding cards from the input station to the transport drum and for removing cards from the transport drum and feeding them to the output stations. Such controllable transfer mechanisms are described and claimed, for example, in copending application Serial No. 538,111 filed October 3, 1955 in the name of Robert M. Hayes et al.

In the system and apparatus of Figure 1, all of the cards fed from the input card holder station 12 to the transport drum 16 may be processed by the transducer member 26. The cards are read by the transducer member 26 and circulated around the drum 16 to the output station 28 until a desired card is read. When a desired card is read by the transducer member 26, this member causes a control circuit to actuate the gate transfer mechanism of one embodiment of the invention such that the card becomes transferred to the drum 20. This latter card is then processed by the transducer member 27, and it is deposited in the output station 34.

Figures 5, 6:
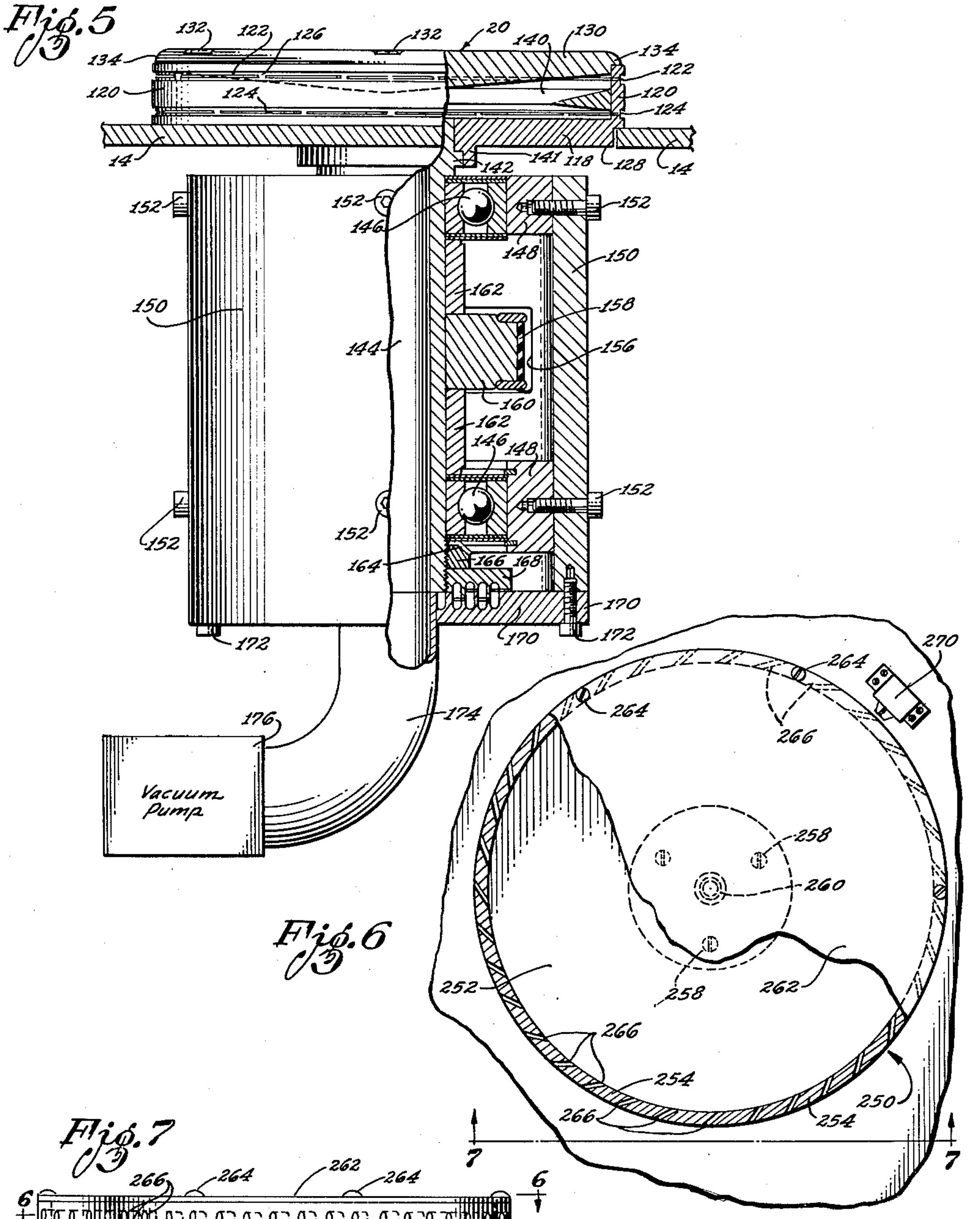
Figure 5 is a sectional view substantially on the line 5—5 of Figure 1 and illustrates the details of a typical rotatable transporting drum with which the transfer mechanism of the embodiment of the invention shown in Figure 1 may be used.
Figure 6 is a top view, substantially on the line 6—6 of Figure 7, of a second embodiment of the invention, in which the concepts of the invention are applied to a stationary transport drum that may be used for guiding a movement of information surface cards around its peripheral surface.

Both the vacuum pressure transport drums 16 and 20 are constructed to exhibit a vacuum pressure at their respective peripheral surfaces. As previously noted, this vacuum pressure serves to retain the cards firmly on the drums. Since the drums may be similar in their construction, only the details of the drum 20 are shown in Figure 5. The constructional details of the drum shown in Figure 5 are similar to those making up the drum described and claimed in copending application Serial No. 600,975 filed July 30, 1956 in the name of Loren R. Wilson, now U.S. Patent No. 2,883,189.

The drum 20 has a lower section and an upper section. The lower section of the drum includes a disk-like bottom portion 118 and an annular side portion 120 integral with one another. A pair of axially spaced peripheral slots or orifices 122 and 124 extend through the side portion 120. Each of the peripheral orifices is discontinuous in that it is interrupted at selected intervals about its periphery by ribs 126 integral with the side portion 120.

The disk-like bottom portion 118 of the lower section of the drum is shown undercut as at 128 so that the ends of this portion will have a reduced diameter with respect to the outer diameter of the annular side portion 120. This enables the table top 14 to extend beyond the outer limits of the side portion 120 so that the portion 120 overlaps the table top in the illustrated manner. Therefore, even without excessively close tolerances between the edge of the table top 14 and the rotating peripheral surface of the drum 20, the cards supported endwise on the table top in the station 12 have no tendency to slip down between the table top and the drum and become misplaced and damaged. This overlapping of the drum and the table top prevents cards from slipping down between the drum and the table top even though the drum and the table top are separated slightly in the vertical direction to provide sufficient clearance for rotation of the drum relative to the table.

The upper section of the drum 20 is in the form of a disk-like member 130 which engages the annular side member 120 of the lower section. The upper section 130 forms an enclosure with the lower section of the drum, with the upper section being parallel to the disk-shaped bottom portion 118 of the lower section. The upper section 130 is held in place on the side portion 120 by a series of set screws 132.

A deflector ring 140 is supported within the interior of the drum in press fit with the inner surface of the annular side portion 120. This deflector ring is tapered toward the center of the drum to prevent turbulence and to provide a streamlined path for air that is drawn in through the peripheral orifices 122 and 124. Since a streamlined path for the air is created, an increased vacuum pressure is produced at the outer peripheral surface of the portion 120. Moreover, the under surface of the upper section 130 is bulged to have a convex shape. This convex shape also aids in providing a smooth path for the air drawn in through the orifices 122 and 124 so as to increase the vacuum pressure at the periphery of the portion 120.

The portion 118 of the lower section of the drum 20 contains a central opening surrounded by an annular collar 141. The collar 141 surrounds a further collar 142 provided at one end of a hollow shaft 144. The drum 20 is supported on a shoulder formed by the collar 142, and the end of the shaft 144 extends into the opening of the portion 118 in friction fit with that portion. Therefore, rotation of the hollow shaft 144 causes the drum 20 to rotate. Also, the hollow interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 by a plurality of studs 152. An arcuate opening 156 is provided in the housing 150 between the bearings 146. This opening enables a drive belt 158 to extend into the housing and around a pulley 160. The pulley 160 is affixed to the shaft 144 between the bearings 146 and is held against axial movement by sleeves 162. In this way, the shaft 144 and the drum 20 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft, and a lock washer 164 is interposed between it and the lower bearing. A sealing disk 168 is also screwed on the threaded portion at the bottom of the shaft 144. The sealing disk 168 operates in conjunction with a bottom plate 170 to inhibit the movement of air between the interior of the housing 150 and the interior of the hollow shaft 144 when a difference of pressure exists between the housing and shaft.

The bottom plate 170 is secured to the housing 150 by studs 172, and it has a central circular opening. A hollow conduit 174 extends into the opening in friction fit with the plate 170. The conduit 174 is axially aligned with the hollow shaft 144 so that air may be exhausted from the hollow interiors of the shaft and the conduit by a vacuum pump 176. The vacuum pump may be of any suitable known construction and, for that reason, is shown merely in block form.

The vacuum pump 176 draws air inwardly through the orifices 122 and 124, through the interior of the vacuum pressure transport drum 20, downwardly through the shaft 144 and through the conduit 174. This creates a vacuum pressure at the outer peripheral surface of the annular portion 120 of the lower section of the drum. The deflector ring 140 and the convex under side of the disk-like upper section 130 assures that the air will flow smoothly and with a minimum of turbulence. This assures a high and adequate vacuum pressure around the outer surface of the annular side portion 120 to firmly retain the cards 10 on that surface.

The transfer mechanism shown in Figures 1 to 4, inclusive, is indicated generally at 200 and is constructed in accordance with one embodiment of the invention. The transfer mechanism 200 includes a housing which forms a chamber 202, and it further includes a conduit 204 communicating with that chamber. This conduit is secured to the table top 14 by appropriate nuts 206, for example, and it extends down through the table top. The conduit 204 serves not only to supply air under pressure to the chamber 202, but it also serves to support the transfer mechanism 200 rigidly between the drums 16 and 20 in the desired position to effect a transfer of cards from one drum to the other.

The transfer mechanism 200 has an arcuate shaped guide surface 208 which extends between the peripheral surfaces of the drums 16 and 20. The two ends of this guide surface extend in essentially tangential relationship with the peripheral surfaces of respective ones of the drums. As shown, for example, in Figure 4, the housing has a cover 210 which is secured to the housing by a plurality of screws 212, and this cover serves to form the chamber 202 within the housing.

A plurality of orifices 214 extend through the wall of the chamber 202 to the arcuate shaped guide surface 208. These orifices are inclined to the guide 208 so as to extend from the rear wall of the guide surface to the front wall of the guide surface at an angle in the direction of card movement from the drum 16 to the drum 20. In this way, when a pressurized fluid such as air is introduced into the chamber 202, streams of air emerge from the orifices 214 at an angle to the surface of the arcuate shaped surface 208 and at spaced points along that surface. These jets or streams of pressurized air pass between the cards transported on the guiding surface 208 and that surface, and these jets set up a Bernoulli effect which causes the cards to be rapidly transported along that surface from the drum 16 to the drum 20 in intimate engagement with the surface.

The pressurized fluid, such as air, may be derived from any appropriate source (not shown), and the pressurized air is introduced to the conduit 204 through a solenoid-actuated valve 216. This valve may be operated by an electric current from an appropriate control source 218.

The leading end of the guide surface 208 of the transfer mechanism 200 is spaced from the peripheral surface of the drum 16 by a distance sufficient to permit cards transported on that surface to be carried past the transfer mechanism unless a further control effect is exerted. This latter control effect is provided by a lifter member 218. This lifter member is controllable in a manner to be described to exert streams of air, or other suitable pressurized fluid, in a tangential direction with respect to the peripheral surface of the drum 16, and in a direction opposite to the direction of motion of cards transported on the peripheral surface of that drum. When the lifter 218 is controlled to produce such streams of pressurized air, the leading edge of a card on the periphery of the drum 16 coming under the influence of the pressurized air streams is lifted outwardly from the periphery of the drum 16 to engage the arcuate guiding surface 208 of the transfer mechanism 200. Subsequent rotation of the drum 16 moves the card farther onto the guiding surface 208 until that card comes under the influence of the air jets from the orifices 214 so as to be rapidly transported along that surface and to the periphery of the drum 20.

The lifter 218 is also displaced from the periphery of the drum 16 by a sufficient distance to enable cards transported on the periphery of the drum 16 to be carried past the lifter when it is deactivated. Therefore, by controlling the air pressure to the lifter 128, the transfer of cards from the drum 16 to the transfer mechanism 200 for subsequent transfer to the drum 20 can be selectively controlled.

Figures 2, 3, 4:
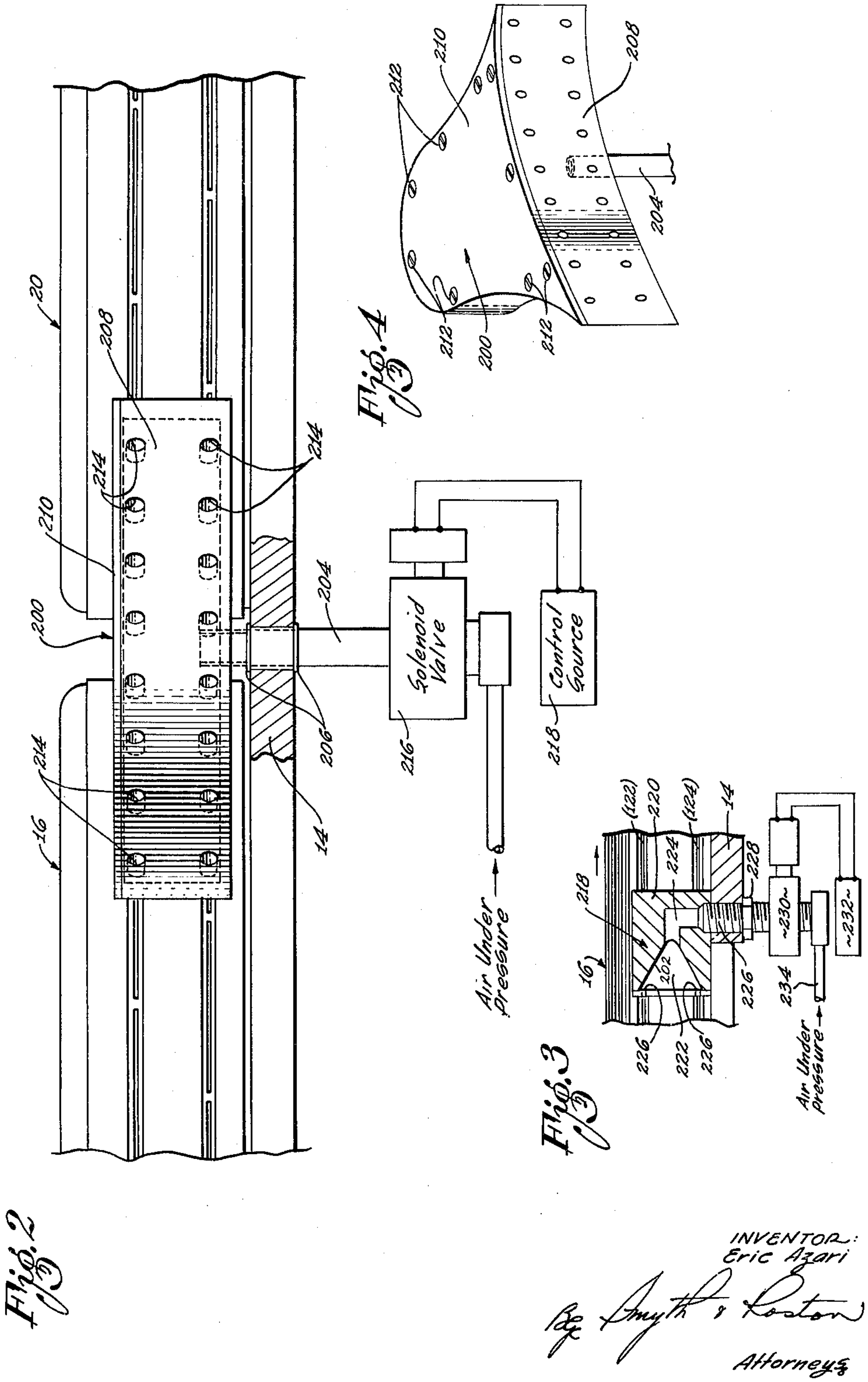
Figure 2 is a side elevational view of the apparatus of Figure 1 and illustrates in somewhat fragmentary form the apparatus and particularly showing the transfer mechanism of the present invention and the means whereby a pressurized fluid is controllably introduced to a single guide surface of that mechanism.
Figure 3 is a sectional view substantially on the line 3—3 of Figure 1 and shows on an enlarged scale with respect to Figure 1 the details of a pneumatic lifter which is used in conjunction with the transfer mechanism of the invention illustrated in Figure 1.
Figure 4 is a perspective view of the transfer mechanism illustrated in Figures 1 and 2, and shows particularly the constructional details of the mechanism and the means whereby pressurized fluid is directed at an angle through a guide rail to an arcuate guide surface of the guide rail.

The constructional details of the lifter 218 are shown in the sectional view of Figure 3, and it includes a housing 220 which encloses a bell-shaped chamber 222. As shown in Figure 1, the housing when viewed in plan has a tear-drop configuration, and it has a narrow end disposed adjacent the peripheral surface of the drum 16 and constituting the leading edge of the lifter. This leading edge is enclosed by an apertured strip 224, and this strip has a series of apertures 226 which are in respective alignment with the peripheral orifices in the drum 16 corresponding to the orifices 122 and 124 in the drum 20 which were described in the description of Figure 5.

The bell-shaped chamber 222 has a channel 225 communicating with its rear end. This channel 225 extends through the housing 220, and it has a downwardly-extending rear portion. A tubular fitting 226 extends through the table top 14 and the upper end of the fitting is threaded into the housing 220 so that the fitting communicates with the rear portion of the channel 225. The tubular fitting 226 may be secured to the underside of the table top 14 by a nut 228. This nut serves to rigidly hold the lifter 218 on the table top in the proper position, and it enables the lifter to be pivoted to a desired tangential relationship with the drum 16 prior to the nut being tightened securely to hold the lifter in place.

The lower end of the tubular fitting 226 is secured to a solenoid actuated valve 230, and this valve may be controlled by electric current from a suitable control source 232. Air under pressure is derived from any suitable source (not shown) and this pressurized air is introduced to the solenoid actuated valve 230 through a line 234. Therefore, the control source 232 controllably feeds electric current to the solenoid actuated valve 230 which, in turn, controls the production of the pressurized streams of air from the apertures 226 in the strip 224 at the leading edge of the lifter. These streams of air serve to strip the cards from the periphery of the drum 16 so that such cards may be fed to the arcuate guiding surface 208 to be transferred to the drum 20.

Therefore, the control source 232 serves to control the transfer of cards from the transport drum 16 to the transport drum 20. As described above, this control may be under the influence of the transducer member 26 which controls appropriate electrical circuitry to cause selected cards to be transferred to the drum 20 for processing by the transducer member 27 and for subsequent depositing in the output station 34, all other cards being transported by the drum 16 past the transfer mechanism 200 to be deposited in the output station 28.

The simplified data processing apparatus shown in Figures 1 and 2, and described above is used merely to illustrate a particular system and apparatus in which the embodiment of the invention shown in Figures 1, 2 and 4 may be incorporated. This embodiment of the invention clearly can be used in any card processing system or apparatus in which it is desired to transfer cards from one transport medium to another.

It will be noted that the transfer mechanism of the invention shown in Figures 1, 2 and 4 permits both of the vacuum transport drums 16 and 20 to rotate in the same direction, which is illustrated as counterclockwise in Figure 1. As noted previously, this enables simplifications to be effectuated in many processing systems and apparatus. Also, and perhaps more importantly, the transfer mechanism of the invention transfers the cards without a corresponding reversal of the contacting face of each card so transferred. The fact that the transfer mechanism of the described embodiment of the invention serves to transport cards along its guiding surface without the need for assistance from the drums 16 and 20 allows the length of the guiding surface to be independent of the length of the cards. This, as described above, allows the transfer mechanism to be used in conjunction with any card size and with any drum size without producing undue flexing of the cards and without creating the necessity of a sharp arcuate surface which would produce such flexing and which also would tend to cause the cards to fly off the transfer mechanism. Moreover, the principles on which the present invention are predicated permit a simplified structure by which a single guiding surface serves to transport the cards, the cards being maintained in intimate engagement with that surface.

The apparatus and system described above in conjunction with Figure 1 has been described as incorporating rotating, vacuum pressure transport drums, of the type shown in Figure 5, to transport the cards from one station to another. In accordance with another embodiment of the present invention, the vacuum transport surface may be extended to have a full annular shape to constitute a transport drum. The resulting transport drum may be stationary, with the cards to be transported being rapidly moved around the peripheral surface of the stationary drum. This, of course, leads to simplifications in the apparatus and systems utilizing such drums. A stationary transport drum constructed in accordance with a second embodiment of the invention is shown, for example, in Figures 6 and 7. It should be appreciated, however, that the vacuum transport surface need not be annular but can have any other configuration.

Figure 7:
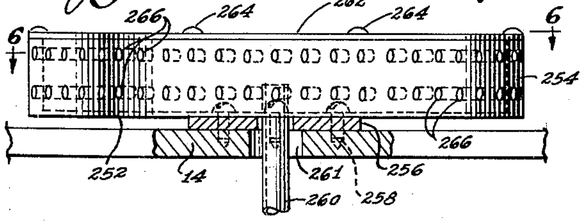
Figure 7 is a side elevational view of the transport drum of Figure 6 and shows particularly a plurality of angled orifices extending through the peripheral edge of the drum for performing the purpose of the invention.

The transport drum shown in Figures 6 and 7 may have an integral construction to be somewhat similar to the drum described in conjunction with Figure 5. Although the periphery of the drum is shown in Figure 6 as having an annular configuration, it should be appreciated that the drum may have any other configuration. For example, the drum may be elliptically shaped or may be provided with any other configuration disposed in a closed loop. The drum of Figures 6 and 7 is indicated generally at 250, and it includes a disk-like bottom portion 252 and an integral annular side portion 254. The disk-like bottom portion 252 may be secured to a collar 256 which is interposed between the drum and the table top 14. The disk-like portion 252 may be so secured by a plurality of screws 258 which also serve to fasten the collar 256 to the table top 14. In this manner, the drum 252 may be rigidly fastened to the table top 14. A tubular shaft 260 extends upwardly through an aperture 261 in the table top 14 and through an opening in the bottom of the portion 252 of the drum in pressed fit with the bottom portion. The tubular portion 262 serves to introduce a pressurized fluid such as air from any suitable source into the interior of the drum 250.

The drum 250 has a disk-like top portion 262 which is secured to the annular side portion 254 by a plurality of screws 264 to form an enclosure or chamber within the drum. A plurality of orifices 266 extend through the annular side portion 254 of the drum at spaced angular positions around the peripheral surface of the drum. Each of these orifices extends through the peripheral edge of the drum at an angle to the peripheral surface in the direction of movements of the cards along the peripheral surface. The pressurized air is introduced to the interior of the drum 250 through the tubular member 260 and the resulting air pressure built up within the drum 250 causes air jets to emerge through the orifices 266. Each of these air jets extends in an angular direction with respect to the outer peripheral surface of the annular side portion 254 of the drum. Then, when cards are fed to the drum 250, such cards are rapidly transported around the peripheral surface of the drum by these jets. As in the latter embodiment, the jets create a Bernoulli effect so that the cards hug the peripheral surface and are rapidly moved about it in the direction of the air streams from the orifices 266. This movement is at a constant and predetermined rate in accordance with the perimeters of the orifices 266 and in accordance with the flow of air through the orifices.

It is evident that cards may be fed to and removed from the peripheral surface of the drum 250 in the same manner as cards are fed to and removed from the rotatable vacuum transport drums 16 and 20 in Figure 1. These cards may move past transducing heads 270 which are disposed in contiguous relationship to the drum shown in Figures 6 and 7 to read information from the cards or to write information on the cards.

In the apparatus described in Figure 1, the cards are shown as transported from one station to another by means of the rotatable vacuum transport drums 16 and 20. In the description of the preceding paragraphs, it has been suggested that these rotatable drums may be replaced by the stationary drums of Figures 6 and 7. The apparatus shown in Figure 8, however, replaces drums, either rotatable or stationary, as the transporting means, and utilizes in their stead sections of guide members constructed in accordance with yet another embodiment of the invention.

In the apparatus of Figure 8, a first card holder station 300 is shown as being mounted on the horizontal table top 14. This card holder station supports the cards 10 in a stacked relationship with the lower edges of the cards resting on the table top, in much the same way as the cards are supported in the input station 12 of Figure 1. The station 300 has a pair of parallel guide walls 302 and 304 which are secured to the table top 14 and which are spaced apart a distance corresponding to the length of each of the cards 10.

A circular feeder member 305 is rotatably mounted on the table top 14 adjacent the mouth of the station 300. The station 300 includes a pusher member 306 which is adapted to slide along the table top between the walls 302 and 304 of the station. A coil spring 308 is used to bias the pusher member forwardly toward the mouth of the station so that the cards 10 are held in a stacked relation with the leading card disposed against the peripheral surface of the circular member 305. The circular member 305 is shown in Figure 8 as rotating in a counter-clockwise direction. As this member is rotated, it serves to feed cards across the leading edge of the wall 304 in a one-by-one sequence to the transport system of the invention.

In accordance with the latter embodiment of the invention, the transport system includes, in the illustrated apparatus, three guide or track sections 310, 312 and 314. Each of these guide sections may be similar in its construction to the transfer mechanism of Figure 4, the only difference being that the configuration of the guide surface associated with each such section is shaped to conform to the direction in which the cards are to be transported.

The guide section 310, for example, may have a rectangular configuration and it is disposed adjacent the wall 304 of the station 300 to receive cards fed from the station by the circular member 305. The section 310 has a guide surface 316, and a plurality of orifices 318 extending angularly from the inner chamber of the section 310 to that surface at spaced points along the surface. Two rows of the orifices may be used, as in the previous embodiments and as shown, for example, in Figures 2, 4 and 7.

Pressurized fluid, such as air, may be introduced to the chamber of the section 310 through a line 320 which communicates with the chamber. A plurality of air jets are thereby caused to emerge from the guide surface 316, each at an angle to that surface so that cards, in the manner described above, may be rapidly transported along that surface to the right in Figure 8. A transducer member 322 is secured to the table top 14 adjacent the end of the guide section 310 remote from the station 300. The face of the transducer member 322 is aligned with the guide surface 316 so that cards transported along that surface are caused by the air jets to pass over the face of the transducer member 322 in intimate contact with that transducer member.

The guide section 312 has a guide surface 324 of a convex, arcuate configuration. This latter section is positioned on the side of the transducer member 322, remote from the section 310 and the pressurized air is introduced to one section of its inner chamber through a line 326. This section of its inner chamber communicates with the guide surface 324 through a series of angled orifices 328, and these orifices produce air jets along the surface 324 to move the cards from the transducer head 322 to a station 330.

The station 330 may be similar in its construction to the station 300. This latter station has a circulating wheel 332 for feeding the cards into the station, and it has a leading wall 334 and a trailing wall 336. The trailing wall 336 is made slightly longer than the leading wall 334, as is the case with the wall 302 as compared with the wall 304 in the station 300, so that the cards may be arrested as they are fed into the station 330 and appropriately stacked in that station against a pusher member 338 which is resiliently biased against the cards by a coil spring 340.

Therefore, when pressurized air is introduced to the guide section 310 and to the guide section 312, and when the circular feeder members 305 and 332 are rotated in a counterclockwise direction, the cards 10 may be fed from the station 300 and transported on the guide surfaces 316 and 324 past the transducer member 332 to be deposited in the station 330.

The guide section 314 may have a concave-like arcuate guide surface 342, and this latter section is positioned adjacent the section 312 to form a Y-shaped branched arrangement when viewed in plan in Figure 8. This latter section receives air pressure through a line 344, and the air pressure is transmitted to the surface 342 through a plurality of angled orifices 346. The orifices are so inclined that the air jets emerge from the surface 342 in such a direction that cards may be rapidly transported along that surface to a station 348 at the right hand end of the section 314. The station 348 may be similar in its construction to the stations 300 and 330, and the latter station may have a rotatable circular feeder member 350 associated with it.

The left hand end of the guide section 312 may have a separate compartment or chamber which is fed by a separate feed line 352. It is apparent then that when the feed line 352 continually supplies air pressure to the left hand end of the guide section 312, the controlled application of air through the feed lines 326 and 344 will cause the cards to be transported either over the guide surface 328 or the guide surface 342 or to the station 348. The control of the air pressure through the lines 326 and 344 may be made by solenoid actuated valves similar in each instance to the valve 216 in Figure 2, and this control may in turn be effected by the transducer member 322. Also, other transducer members may be associated with the sections 312 or 314, or both, for processing the cards transported by those sections.

The apparatus of Figure 8, is, therefore, the equivalent of the apparatus of Figure 1, with the cards in an input station 300 being controllably fed either of two output stations 330 or 348.

Each of the track sections 310, 312 or 314 may be sectionalized as shown by a fragment of a track section 400 in Figure 9. This section has a first series of angled orifices extending from its chamber to its guide surface 402, this first series being indicated as 404. These orifices direct streams of pressurized fluid through the guide surface 402 and in a direction to the right in Figure 9. The track 400 also has a second series of angled orifices 406 extending from its chamber to its guide surface 402. These latter orifices are positioned to direct streams of pressurized air in a direction to the guide surface 402 and to move the cards to the left in Figure 9. The chamber portion of the track 400 may be sectionalized so that a first inlet will provide air pressure to all the orifices 404, and a second inlet will provide air pressure to all the orifices 406. In this manner, the arrangement of Figure 8, by using the track sections of Figure 9, may be controlled so that cards can be transported by the track sections in either direction between the different card holder stations 300, 330 and 348. Also, and by merely reversing the direction of rotation of the circular feeder members 305, 332 and 350, the cards can be fed either into or out of the various stations. This, of course, adds to the flexibility of the equipment.

The embodiment of Figure 10 is similar in some respects to the one in Figure 8 and like elements have been designated by the same numerals. In the embodiment of Figure 10, however, the stations 300, 330 and 348 of Figure 8 are replaced by a corresponding plurality of transport drums 450, 452 and 454. These drums may be rotatable like the drum described in conjunction with Figure 5, or they may be stationary like the drum of Figures 6 and 7.

The drum 450 may have stations associated with it like the stations 10 and 23 of Figure 1, as may the drums 452 and 454. Moreover, the track sections 310, 312 and 314 may be constructed like the section of Figure 9 to permit cards to be transported in both directions.

A plurality of lifters 456, 458 and 460 are positioned between the end of the track sections 310, 312 and 314 and the corresponding drums 450, 452 and 454. These lifters may be constructed in a manner similar to the lifter described in conjunction with Figure 3. The arrangement is such that a card carried on any of the drums is transferred in the described manner to the corresponding track when the particular lifter is activated.

Consider for example, a case in which the drums 450 and 452 are rotating in a clockwise direction, and the drum 454 is rotating in a counterclockwise direction. The drum 450 may have a feed station and a stack station associated with it, as well as a transducer means. The drums 452 and 454 may also each have a stack station and a feed station and a transducer means.

Then cards fed to the drum 450 from its feed station may be processed by its transducer means and selectively fed to the track station 310 by the controlled activation of the lifter 456 or transported by the drum 450 past the track section and the lifter to the stack station associated with that drum. The cards transferred to the track section 310 may be further processed by the transducer 322 and transported either to the drum 452 or to the drum 454. These cards may then be circulated by these drums as deposited in their stack stations.

All the stations associated with the drums 450, 452 and 454 may be of the reversible feed-stack type instead of the single purpose type described above. Then, by reversing the rotation of the drums and by changing the modes of the stations, cards previously fed to the drums 452 and 454, by the activation of the lifters 458 and 460 may be transferred to the track sections and returned, for example, to the drum 450.

It is clear, therefore, that apparatus such as the apparatus of Figure 10 is capable of extreme flexibility in that it permits a wide diversity of sorting and other handling operations to be performed on the cards.

The present invention provides, therefore, simplified apparatus and equipment for transporting information storage cards from one station to another, or from one transporting medium to another. The equipment of the present invention is simplified as compared with the prior art equipment because it does not require mechanically movable parts and therefore obviates the difficulties attendant to such moving parts. In accordance with the invention, transport of the cards is effectuated along a single guide surface by the production of a stream of air along that surface of such a nature that the cards are caused to move intimately with the surface and in the direction of the air stream. This provides simplified and improved apparatus in which cards may be rapidly and efficiently transferred from point to point.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In a combination for use in apparatus for processing data on a plurality of information storage cards, guide means for transporting the information storage cards including a guiding surface on which the information cards are to be moved, pneumatic means disposed in coupled relationship to the guide means for creating a force to retain the cards on the guiding surface and to move the cards along the guiding surface, a second member for obtaining a movement of the cards, transducing means disposed in cooperative relationship with the cards for processing particular information on the cards, and means disposed in cooperative relationship with the guide means and the second member for obtaining a transfer of cards between the guide means and the second member in accordance with such processed information.

2. In combination for use in apparatus for processing data on a plurality of information storage cards, stationary guide means for transporting the information storage cards including a guiding surface on which the information cards are to be moved, said guiding surface having at least one opening therein, means coupled to the guide means for directing a pressurized fluid through the opening at an angle in the direction of movement of the cards to maintain the cards on the guiding surface and to move the cards along the guiding surface, a member for holding the cards, and means coupled to the cards for obtaining a transfer of cards between the holding member and the guide means.

3. In combination for use in apparatus for processing data on a plurality of information storage cards, stationary guide means for transporting the information storage cards including a guiding surface on which the information cards are to be moved, said guiding surface having a plurality of angled orifices disposed at spaced intervals along the path of movement of the cards, means disposed in cooperative relationship with the guide means for directing a pressurized fluid through each of the orifices in the guiding surface at an angle to the guiding surface to hold the cards on the guide means and to move the cards along the guiding surface, a second member constructed to obtain a movement of the cards, transducing means disposed in coupled relationship to the transported cards for processing particular information on such cards, and means controlled by the transducing means for obtaining a retention of particular cards on the guide means and a transfer of other cards from the guide means to the second member in accordance with the information processed on the cards.

4. In combination for use in apparatus for processing data on a plurality of information storage cards, stationary guide means for transporting the information storage cards including a guiding surface on which the cards are to be moved in at least first and second different directions, said guiding surface having a first plurality of angled orifices extending in a first direction corresponding to the first direction of movement of the cards and having a second plurality of angled orifices extending in a second direction corresponding to the second direction of movement of the cards, transducer means operatively coupled to the cards for producing signals in accordance with the information recorded on the cards, and means coupled to the guide means and responsive to the signal information from the transducer means for controllably directing a pressurized fluid through the first or second pluralities of orifices in the guiding surface in accordance with such signal information to hold the cards on the guide means and to selectively move the cards along the guiding surface in the first and second directions.

5. In combination for use in apparatus for processing data on a plurality of information storage cards, stationary guide means for transporting the information storage cards including a guiding surface on which the cards are to be moved, means coupled to the guide means for creating a Bernoulli effect on the guiding surface in the direction of movement of the cards and at spaced points therealong to attract the cards to the guiding surface and to move the cards along the guiding surface, a second member constructed to obtain a movement of cards, transducing means disposed in coupled relationship to the cards on the second member for processing particular information on such cards, and means coupled to the transducing means for obtaining a retention of particular cards on the second member and a transfer of other cards to the guide means in accordance with the processed information.

6. In combination for use in apparatus for processing data on a plurality of information storage cards, a stationary guide element having a looped configuration for transporting the information storage cards and including a peripheral guiding surface along which the cards are to be moved in the looped direction, means coupled to the guide element for angularly directing a pressurized fluid through the guiding surface and at spaced angular positions along the guiding surface to hold the cards on the guide element and to move the cards along the guiding surface in the looped direction, a member constructed to receive cards from the stationary guide element and to hold such cards, transducing means disposed in cooperative relationship with the cards on the guide element for processing particular information on such cards, and means coupled to the transducing means for obtaining a transfer of selected cards from the guide element to the receiving member and for obtaining a retention of other cards on the guide element in accordance with information processed on the cards.

7. In combination for use in apparatus for processing data on a plurality of information storage cards, a stationary drum disposed in a loop for transporting the cards and having an outer peripheral surface along which the cards are to be moved in the looped direction, means disposed in cooperative relationship with the drum for creating a Bernoulli effect on the outer peripheral surface of the drum to hold cards on the drum and to move the cards around the peripheral guiding surface in a selected direction, a second member constructed to receive cards and to hold such cards, transducing means disposed in cooperative relationship with the cards on the second member for processing particular information on such cards, and means coupled to the transducing means for obtaining a retention of particular cards on the second member and for obtaining a transfer of other cards to the drum in accordance with the information processed on the cards.

8. In apparatus for processing data on a plurality of information storage cards, the combination of, a first station and a second station disposed in spaced relationship, means including guide means disposed between the first and second stations for guiding the movement of cards from the first station to the second station, said guide means including a guiding surface on which the information cards are moved from the first station to the second station, and means coupled to the guiding surface for directing a pressurized fluid along said guiding surface to hold the cards on the guiding surface and to move the cards along the guiding surface from the first station to the second station.

9. In apparatus for processing data on a plurality of information storage cards, the combination of, a first means constructed to hold cards in stacked relationship, a second means constructed to hold cards in stacked relationship and spaced from the first support means, stationary guide means disposed between the first and second means for guiding the movement of cards from the first supporting means to the second supporting means, said stationary guide means including a guiding surface along which the cards are to be moved, and pneumatic means coupled to the guide means for producing a force on the cards to hold the cards on the guide means and to move the cards along the guiding surface from one of the supporting means to the other.

10. In apparatus for processing data on a plurality of information storage cards, the combination of, a first means constructed to support information storage cards, a second means constructed to support information storage cards and disposed in spaced relationship to the first support means, a stationary guide means disposed between the first and second support means for transporting cards from the first supporting means to the second supporting means, said guide means including a guiding surface on which the information cards are to be moved from the first supporting means to the second supporting means, said guiding surface having a plurality of angled orifices at spaced positions in the direction of movement of the cards, and pneumatic means coupled to the guide means for directing a pressurized fluid through the apertures in the guiding surface to hold the cards on the guide means and to move the cards along the guiding surface from the first supporting means to the second supporting means.

11. In apparatus for processing data on a plurality of information storage cards, the combination of, a first transport medium for the cards, a second transport medium for the cards and spaced from the first transport medium, a stationary guide means disposed between the first transport medium and the second transport medium for guiding the movement of cards from the first transport medium to the second transport medium, said guide means including a guiding surface along which the cards are moved from the first transport medium to the second transport medium, means coupled to the guide means for creating a Bernoulli effect on the guiding surface to hold the cards on the guiding surface and to move the cards along the guiding surface from the first transport medium to the second transport medium, transducing means disposed in coupled relationship to the cards on the first transport medium for processing particular information on the cards, and means coupled to the Bernoulli means and responsive to the information processed by the Bernoulli means for obtaining a transfer of particular cards from the first transport medium to the guide means for transfer to the second transport medium and for obtaining a retention of cards on the first transport medium.

12. In apparatus for processing data on a plurality of information storage cards, the combination of, a first vacuum pressure rotatable transport drum for transporting cards on its peripheral surface, a second vacuum pressure rotatable transport drum for transporting cards on its peripheral surface and disposed in spaced relationship to the first drum, a stationary guide means disposed between the first and second drums for guiding the movement of cards from the first drum to the second drum, said guide means including a guiding surface along which the cards are moved from the first drum to the second drum, and pneumatic means coupled to the guide means for creating a Bernoulli effect on the cards disposed on the guiding surface and at spaced intervals in the direction of movement of the cards to hold the cards on the guide means and to move the cards along the guiding surface from the first transport drum to the second transport drum.

13. In apparatus for processing data on a plurality of information storage cards, the combination of, first movable transport means for transporting the cards on its peripheral surface, second movable transport means for transporting the cards on its peripheral surface, stationary guide means for transferring cards from the first transport means to the second transport means and disposed in cooperative relationship with the transport means, said guide means including a guiding surface along which the cards are moved from the first transport means to the second transport means, pneumatic means coupled to the guide means for directing a force through the guiding surface and at spaced intervals in the direction of movement of the cards to hold the cards on the guide means and to move the cards along the guiding surface from the first transport means to the second transport means, and means including transducing means disposed in contiguous relationship to the first transport means for controllably directing selected cards carried on the peripheral surface of the first transport means to the guide means for transfer thereby to the second transport drum and for obtaining a movement of other cards with the first transport means past the position of transfer to the second transport means.

14. In apparatus for processing data on a plurality of information storage cards, the combination of, a first rotatable vacuum pressure transporting drum for carrying cards on its peripheral surface, a second rotatable vacuum pressure transport drum for carrying cards on its peripheral surface and disposed in spaced relationship to the first drum, a stationary guide means disposed in cooperative relationship with the first and second drums for guiding the movement of cards from the peripheral surface of the first drum to the peripheral surface of the second drum, said guide means including an arcuate guiding surface along which the cards are moved from the first drum to the second drum and said guiding surface having a plurality of orifices therein at spaced positions in the direction of movement of the cards, the orifices each extending at an angle to the guiding surface, means coupled to the guiding surface for directing a pressurized fluid through the orifices in the guiding surface to hold the cards on the guide means and to move the cards along the guiding surface from the first transport drum to the second transport drum, and means coupled to the guiding surface and including transducing means coupled to the cards on the first drum for controllably directing a stream of pressurized fluid tangentially of the peripheral surface of the first drum to cause selected cards carried on that surface to be directed from the first drum to the guide means for transfer to the second drum and other cards to move with the first transport drum past the position of transfer to the second drum.

15. In apparatus for processing data on a plurality of information storage cards, the combination of, a first card holding station for supporting information storage cards in a stacked relationship, a second card holding station for supporting information storage cards in a stacked relationship and disposed in spaced relationship to the first card holding station, a stationary guide means disposed in co-operative relationship with the first card holding station and the second card holding station for directing the movement of cards between the first card holding station and the second card holding station, said guide means including at least one guiding surface along which the information cards are to be moved and said guide means having a plurality of angled orifices therein at spaced positions along the guiding surface, and means disposed in co-operative relationship with the guide means for directing a pressurized fluid through the orifices in the guiding surface to maintain the cards on the guiding surface and to move the cards along the guiding surface from one of the card holder stations to the other.

16. In apparatus for processing data on a plurality of information storage cards, the combination of, a first card holding station for supporting the cards in a stacked relation, at least a pair of further card holding stations for supporting the cards in a stacked relation and disposed in spaced relationship to the first station and to each other, stationary guide means disposed in coupled relationship to the card holding stations for guiding the movement of cards from the first card holding station to each of the further card holding stations, said guide means including a guiding surface along which the information cards are to be moved from the first station to the further stations, said guiding surface having a plurality of orifices at spaced positions in the direction of movement of the cards, pneumatic means coupled to the guide means for producing a Bernoulli effect through the orifices in the guiding surface to retain the cards on the guide means and to move the cards along the guiding surface from the first station to selected ones of the further stations, and means including transducing means coupled to the guide means for operating on the cards moving on the guiding surface to control the movements of the cards to the different ones of the further card holding stations in accordance with signals produced in the transducing means.

17. In apparatus for processing data on a plurality of information storage cards, the combination of, a first card holder station for supporting the cards in a stacked relation, at least second and third card holder stations for supporting the cards in a stacked relation and disposed in spaced relationship to the first card holder station and to each other, a plurality of stationary guide members disposed in co-operative relationship with the different card holder stations for guiding the movement of cards from the first card holder station to the second and third card holder stations, each of said guide members including a guiding surface along which the information cards are to be moved and said guiding surface having a plurality of angled orifices at spaced positions in the direction of movement of the cards along the guiding surface, control means disposed in co-operative relationship with the guide means and including transducing means for directing a pressurized fluid through the orifices in the guiding surfaces of selected ones of the guide members to maintain the cards on the guide members and to move the cards along the guiding surfaces from the first card holder station to selected ones of the further card holder stations in accordance with signals read by the transducing means.

18. In apparatus for processing data on a plurality of information storage cards, the combination of, a plurality of transport media for the cards disposed in spaced relation with one another, stationary guide means disposed in coupled relation with the transport media for moving cards between the transport media and from one of the transport media to selected ones of the other transport media, said guide means including a guiding surface along which the information cards are to be moved between the transport media, said guiding surface having a plurality of angled orifices at spaced positions in the direction of movement of the cards, pneumatic means coupled to the guide means for directing pressurized fluid through the orifices to move the cards along the guiding surface, and means including transducer means for controlling the movements of cards along the guiding surface to selected ones of the transport media in accordance with signals produced by the transducing means.

19. In apparatus for processing data on a plurality of information storage cards, the combination of, a first transport drum for the cards, at least two further transport drums for the cards disposed in spaced relation with the first transport drum and with each other, stationary guide means disposed in coupled relationship with the first transport drum and with the further transport drums for moving the cards from the first transport drum to the further transport drums, said guide means including a guiding surface along which the information cards are to be moved from the first transport drum to the further transport drums, said guiding surface having a plurality of angled orifices at spaced positions in the direction of movement of the cards, pneumatic means coupled to the guide means for directing pressurized fluid through the orifices to create a Bernoulli effect at the guiding surface so as to move the cards along that surface and retain the cards on that surface, and means including transducing means coupled to the guide means for controlling the movements of the cards to different ones of the further transport drums in accordance with signals produced by the transducing means.

20. In apparatus for processing data on a plurality of information storage cards, the combination of, a first rotatable vacuum pressure drum for transporting the cards, a second and a third vacuum pressure drums for transporting the cards spaced from the first drum and from each other, stationary guide means disposed in coupled relationship with the first drum and with the second and third drums for moving the cards from the first drum selectively to the second and third drums, said guide means including a guiding surface along which the information cards are to be moved from the first drum to the second and third drums, said guiding surface having a plurality of angled orifices at spaced positions in the direction of movement of the cards, pneumatic means coupled to the guide means for directing pressurized fluid through the orifices to create a Bernoulli effect at the guiding surface so as to move the cards along that surface and retain the cards on that surface, and means including transducing means coupled to the guide means for controlling the movements of cards along the guiding surface to different ones of the second and third drums in accordance with signals produced by the transducing means.

21. In combination for use in apparatus for processing data on a plurality of information storage cards, the combination of: stationary guide means for obtaining a transport of the cards in the plurality including a guide surface on which the cards are to be moved, the guiding surface being provided with a first portion and with first and second branches extending from the first portion to obtain a controlled movement of the cards along the first portion and then along the first branch or to obtain a movement of the cards along the first portion and then along the second branch, pneumatic means disposed in coupled relationship to te guide means for creating a force to retain the cards on the guiding surface and to move the cards along the guiding surface, and means including transducing means disposed in cooperative relationship with the cards on the first portion of the guiding surface for processing particular information on such cards to obtain a controlled movement of first particular cards in the plurality along the first branch of the guiding surface and a movement of second particular cards in the plurality along the second branch of the guiding surface in accordance with the information processed on the cards.

22. In combination for use in apparatus for processing data on a plurality of information storage cards, stationary guide means for transporting the information storage cards including a guiding surface for the cards, the guiding surface for the cards being constructed to define a first portion and to define first and second branches extending from the first portion, said guiding surface having a plurality of orifices disposed at spaced intervals along the first portion and along the first and second branches, the orifices in the plurality being inclined at an angle in the direction of movement of the cards along the guiding surface, means disposed in cooperative relationship with the guide means for directing pressurized fluid through the orifices in the guiding surface to hold the cards on the guide means and to move the cards along the guiding surface, and means including transducer means disposed in coupled relationship to the cards on the first portion of the guiding surface and operatively coupled to the fluid-directing means for processing particular information on the cards and for obtaining a controlled operation of the fluid-directing means in accordance with such processed information for a transfer of first particular cards in the plurality from the first portion of the guiding surface to the first branch of the guiding surface and for a transfer of second particular cards in the plurality from the first portion of the guiding surface to the second branch.

References Cited in the file of this patent

UNITED STATES PATENTS

| | | |
|---|---|---|
| 756,600 | Dodge | Apr. 5, 1904 |
| 898,775 | Norton | Sept. 15, 1908 |
| 1,161,346 | Schmidt | Nov. 23, 1915 |
| 1,900,781 | Wardley | Mar. 7, 1933 |
| 2,778,691 | Hazel | Jan. 22, 1957 |